May 26, 1970   J. G. M. C. H. VAN LUYK ET AL   3,513,515
APPARARTUS FOR ASSEMBLING WARPS FOR FABRICS, MORE PARTICULARLY
WARPS FOR SAMPLES AND SPECIMENS OF FABRICS
Filed Oct. 9, 1968                           5 Sheets-Sheet 1

United States Patent Office 3,513,515
Patented May 26, 1970

3,513,515
APPARATUS FOR ASSEMBLING WARPS FOR FABRICS, MORE PARTICULARLY WARPS FOR SAMPLES AND SPECIMENS OF FABRICS
Johannes G. M. C. H. van Luyk and Herman Huskes, Enschede, Netherlands, assignors to Koninklijke Nederlandse Textiel-Unie N.V., Hengelo, Overijssel, Netherlands, a corporation of the Netherlands
Filed Oct. 9, 1968, Ser. No. 766,105
Claims priority, application Netherlands, Oct. 11, 1967, 6713794
Int. Cl. D02h 5/00
U.S. Cl. 28—33                                                         5 Claims

ABSTRACT OF THE DISCLOSURE

Apparatus for assembling warps for fabrics, more particularly short, full-width warps for samples and specimens of fabrics. A rotating reel or drum is axially divided into sections and a large number, e.g. 50, of threads is wound on the reel or drum in one section at a time, in each section the last turn of the threads being partly separated from the preceding turns by means of a separator formed by an arm that is rotatable from its stationary position in a radial plane at the edge of the section into an axial position above the winding surface of the section. Additional separators may be provided in each section for forming a lease and for separating the first turn of the threads from the subsequent turns.

---

Figure 1:
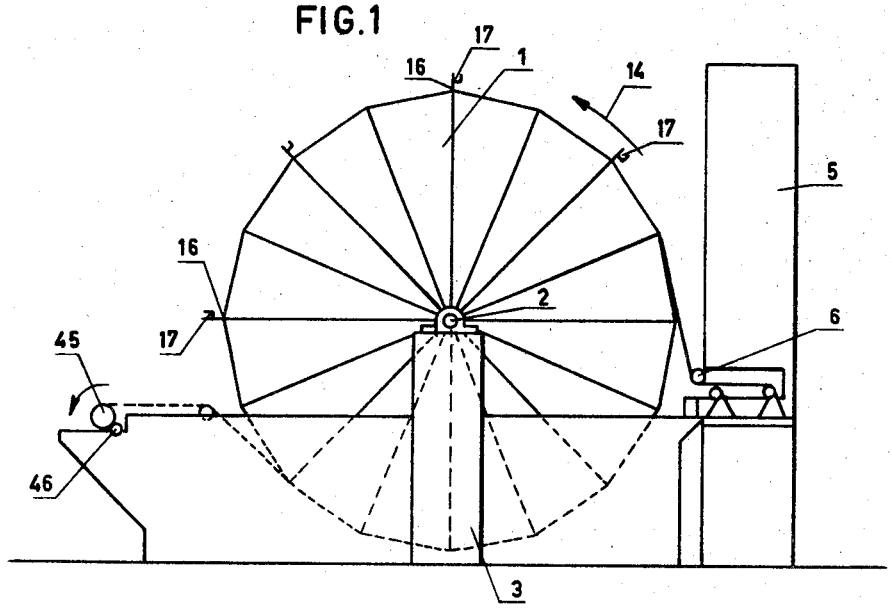

The invention relates to apparatus for assembling warps for fabrics, more particularly warps for samples and specimens of fabrics, whereby a number of threads are wound on a rotatable drum or similar winding body by means of a thread guide movable axially along the drum in such manner that the last turn of a certain number of turns is separated every time from the others at a certain place.

Such apparatus is known, with which one or several threads are wound helically on a rotating drum. For this purpose the thread guide moves continuously along the drum and return every time quickly to its starting position after a number, for example 5 rotations of the drum, thereafter again laying one or a number of threads with the threads already present on the drum.

In this way a package of threads arises which, after having been cut through near the place where the end of every last turn of a cycle is situated, can be unwound as a whole.

With this known apparatus, for instance, 100 threads having a length, for instance, equal to five times the circumference of the drum are obtained which can be unwound from the drum simultaneously and be wound on to a warp beam for use as warp yarn in weaving samples with a length for instance of 50 metres.

With the known apparatus a limitation of the possibility of application is experienced inasmuch as warps for a normal cloth width of 100 cm. for example, which may comprise about 5000 threads, cannot be assembled with it. Moreover, in making a striped warp one is limited to a colour pattern repeating itself after only a few threads each time, owing to which making the warps for the striped and checked designs common in practice is not usually possible with this apparatus.

It is the object of the invention to provide an apparatus that does not have the said limitations and that therefore is particularly suitable for assembling short warps for weaving cloth with a normal width and if desired provided with a striped or checked design.

For this purpose the apparatus according to the invention comprises a drum with a winding surface divided axially into sections, a thread guide with which a large number of threads can be supplied simultaneously to a section of the drum, a moving mechanism for displacing the threads guide stepwise to a following section every time after a specific number of revolutions of the drum, and for each of the sections at least one separator fitted on the periphery of the drum, with which at that place one or more turns can be separated radially from the preceding turn or turns in the same section.

With the apparatus according to the invention a part of the warp can be assembled in each section, and these parts can all be rewound simultaneously on to a warp beam which then contains sufficient warp threads for a normal cloth width.

The number of threads that can be wound on simultaneously in a section is not bound to a clearly defined maximum. Such an embodiment that up to 500 threads can be wound on simultaneously can certainly be counted among the practical possibilities of the apparatus according to the invention.

The apparatus also permits an ample choice where the length of the warp yarn is concerned. This may be from one time to 20 or more times the circumference of the drum, which is preferably about 10 m., owing to which the apparatus is also suitable for application in carrying out smaller production jobs, such as manufacturing special fabrics and for re-supplying small quantities.

This apparatus offers great possibilities for selecting a colour pattern, inasmuch as a specific colour combination need not be repeated each section but can be repeated each time for instance after several sections. These sections with a similar colour combination are wound first, after which a different combination is assembled for the other sections or a number of the other sections and is wound on in the appropriate sections.

The separators are preferably provided with a common operating device, so connected with the separators that these can all be put in the operating position simultaneously and that the return of each of the separators to its non-operating position depends upon the action of a spring. This ensures that a separator of a wound section is kept in the operating position by the turn or turns of the package of threads laid over the separator, while the separators of the sections not yet wound can return to their non-operating position. In this way operation of the separators is exteremely simple.

In order to be able to meet all requirements that may be made, more than one separator may be applied per section. Besides the separators for separating the last turn of a winding, two corresponding separators are desirable at other places on the drum periphery for making a thread-cross (lease) with which the threads of a package are kept in the proper sequence. One separator then separates the even threads from the package and the other the odd threads. Each of these separators, simultaneously with the corresponding separators of the other sections, is put in the operating position at the right moment by a common operating device.

A fourth separator may be desirable in a section in order to separate the first turn from the following turns. This may work automatically if it is constructed in such a way that upon applying the first turn of the package of threads it is put and kept in its operating position by the tension existing therein, so that the following turns are all laid over the separator and remain separated from the first turn.

Figure 2:
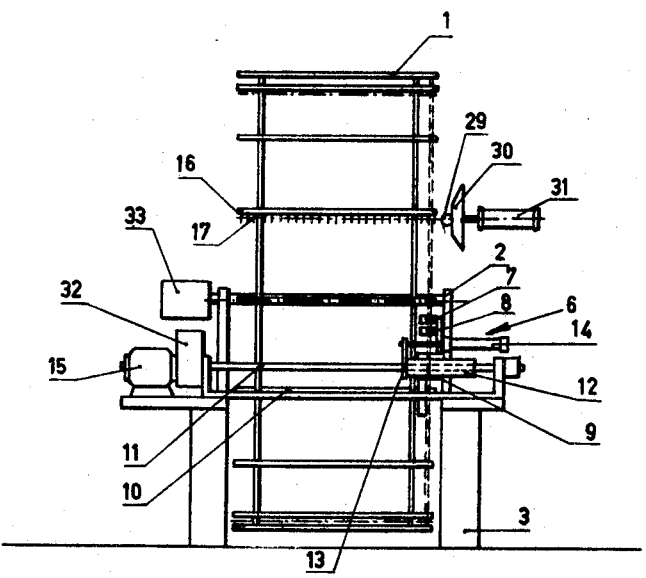
Figure 3:
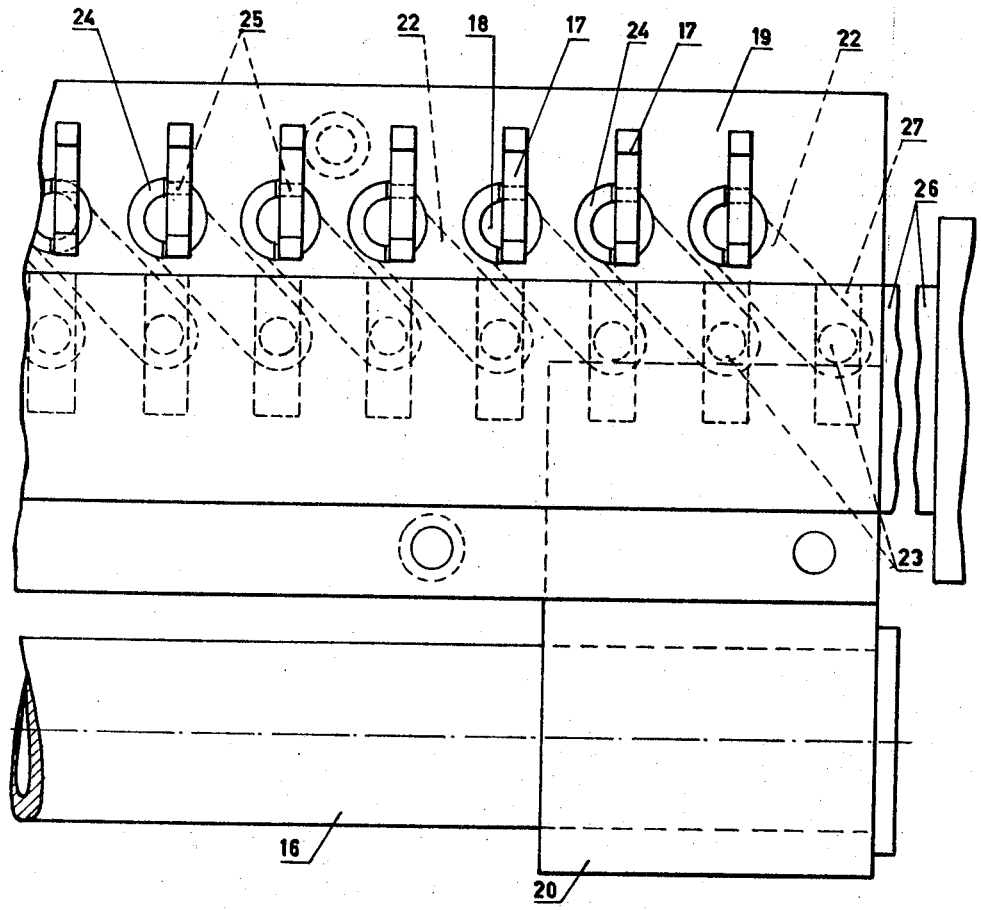
Figure 4:
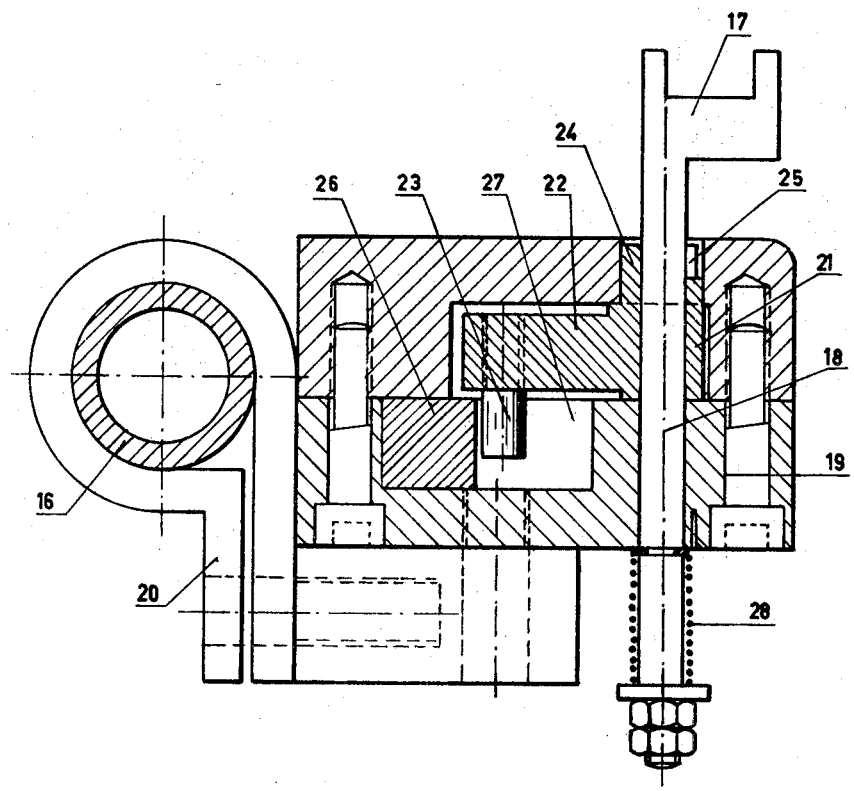
Figure 5:
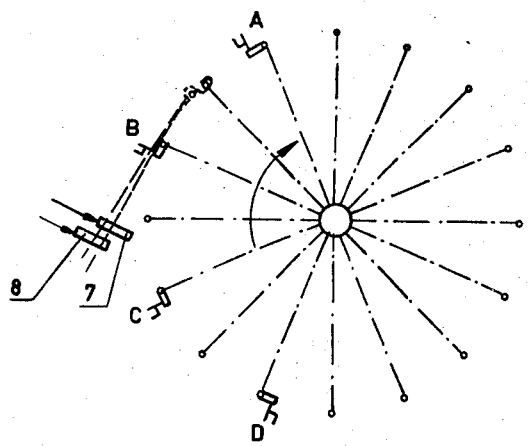
Figure 6:
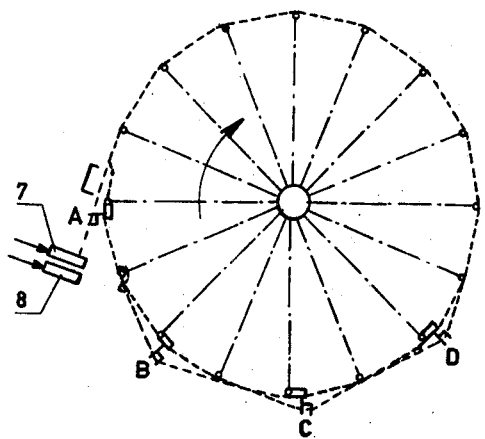

The invention is illustrated below with reference to the drawings, which shows an embodiment of the apparatus according to the invention. In this drawing:
FIG. 1 is a side view, and
FIG. 2 a front view of the apparatus;
FIG. 3 a part of the drum with a row of separators;

FIG. 4 a cross section of this part of the drum;
FIGS. 5 and 6 diagrams of the winding process and
FIG. 7 a variant of the separators.

As FIG. 1 shows, drum 1 is rotatably supported on frame 3 by means of bearings 2. Drum 1 can be driven by means of a motor and reduction gear not shown in the drawing in the direction indicated by arrow 14.

The yarn from which the warp is assembled is supplied via the pre-treatment installation 5, in which the yarn is sized and dried, and yarn guide 6 to drum 1. Pre-treatment installation 5 and yarn guide 6 are equipped to allow, for instance, 50 threads to pass through simultaneously.

Frame 3 is also equipped for supporting warp beam 45 on to which the warp assembled on the drum 1 is wound. For this purpose the motor-driven roll 46 is pressed against warp beam 45 in order to rotate it.

The yarn guide 6 consists of two reeds 7 and 8 borne by carriage 9 displaceable along guide 10. Carriage 9 can be fixed on guide 10 with the aid of a pneumatically operated brake not illustrated.

Parallel to guide 10 the lead screw 11 is rotatably fitter. The nut 12, which can be moved by rotation of shaft 11, is furnished with rim 13 forming a stop for yarn guide carriage 9. By means of pneumatic cylinder 14 connected at one end to carriage 9 and at the other end to nut 12, carriage 9 can be moved against stop 13.

Lead screw 11 is driven by motor 15 via programmable positioning revice 32. By this means nut 12 can be put successively in a number of predetermined positions.

As FIG. 1 shows diagrammatically and FIGS. 3 and 4 show more in detail, four of the ribs 16 of drum 1 each bear a number, for example 40, of separators 17, divided evenly over the width of drum 1. Each separator 17 is U-shaped, the cross piece thereof being located over the winding surface of drum 1 and its two legs being directed radially outwards relatively to drum 1.

Each separator 17 is rotatably fitted by means of its shaft 18, which lies approximately in the continuation of one of the legs of the U-shape, in holder 19 which is fitted with clamps 20 to rib 16 of drum 1. Bush 21, with arm 22, in which pin 23 is fitted, is rotatable about shaft 18. Bush 2 has at its top a collar 24, approximately half of which is removed, which can act in conjunction with cam 25 of shaft 18. Pin 23 interlocks with a recess 27 of bar 26 which is slidable in holder 19.

Upon sliding bar 26 to the left in FIG. 3, the appropriate arm 22 of each separator 17 is moved clockwise through an angle of approximately 90°. Bush 21 takes shaft 18 with it via its collar 24 and cam 25, so that separator 17 also turns about 90° clockwise out of the illustrated position. When the bar moves back, shaft 18 with separator 17 is not turned back by bush 21, as so much of collar 24 is removed that its other end does not come into contact with cam 25. For returning separator 17 to its starting position there is a torsion spring 28 round shaft 18, joined at one end to holder 19 and at the other to shaft 18.

By means of this construction it is possible to bring all the separators fitted to the same rib of drum 1 simultaneously from their stationary position, in which they are in a radial plane of drum 1, i.e. parallel to the turns of thread that are to be applied, into their operating position, in which they stand transversely to the turns of thread to be applied, while the returning movements for each separator 17 are controlled separately by spring 28.

In order to slide bar 26, this is furnished at one end with a roll 29 (FIG. 2), which moves past cam 30 fitted near drum 1 when drum 1 is rotated. Cam 30 is displaceable with the aid of pneumatic cylinder 31 between a position in which roll 29 of bar 26 can pass freely, and a position in which roll 29 is pressed to the left by cam 30 and separators 17 are turned into their operating position.

Operation and use of the apparatus are as follows (see also FIGS. 5 and 6).

While thread guide 6 is in its extreme right position (FIG. 2), a number of threads, for example 50, are led via sizing and drying installation 5 and thread guide 6 to drum 1 and are attached thereto between separators A and B. In doing so, the threads are placed in their correct order next to one another alternately in reeds 7 and 8 of thread guide 6, one reed containing the odd threads and the other the even ones.

The threads are laid in the first section between separators B, after which winding can commence.

When separators C approach the place where the threads run on to the drum, reed 7 is moved forward so that a shed is formed in the threads. At the same time cam 30, owing to actuation of pneumatic cylinder 31 is put in the position in which it can act in conjunction with rolls 29.

When roll 29 of separators C passes cam 30, separators C are turned transversely to the direction of winding, so that separator 17 enters the first section of the drum between the odd and even threads and separates them from one another. Next reed 7 moves back and reed 8 moves forward, whereby upon passing separators D a space is similarly formed between the odd and even threads. Reed 8 is returned to its starting position.

When a roll 29 of a group of separators has passed cam 30, the relative bar 26 and separators 17 return to their starting position, except for those separators on which the threads are wound. These remain in the position transverse to the direction of winding.

Cam 30 is now returned to its non-operating position and the threads are wound up several, for example four, turns.

When in the fifth revolution separators A, approach, cylinder 31 is actuated, whereupon these separators are turned transversely and the fifth turn is separated from the previous ones. Next yarn guide 6 is displaced to a next section of the drum.

This displacement is prepared during winding by moving nut 12 to the next section with the aid of lead screw 10 whose rotation is regulated by positioning device 32. In the meantime yarn guide 6 is kept in place with the brake of carriage 9.

When yarn guide 6 has to be moved to the next section, simultaneously the brake of carriage 9 is released and cylinder 14 is actuated, whereby carriage 9 moves together with thread guide 6 against stop 13 of nut 12, after which the brake of carriage 9 is again actuated to keep thread guide 6 in its new position and nut 12 can be moved to the next position.

After movement of threads guide 6, separators B pass the winding place and cam 30. The action of these separators in conjunction with bar 26 differs from that of the other separators inasmuch as they stand transversely to the direction of winding in their stationary position and are turned parallel to the direction of winding by the action of cam 30. The first turn is therefore placed between the separators at B.

Next, a thread crossing is formed at C and D in the manner already described, cam 30 is returned to its non-operating position and the threads are wound on a number of times. At B these turns come on to the separator which in its stationary position lies transversely to the direction of winding so that they are kept separate from the first turn.

In this way all the sections in which the same colour combination is desired are wound, after which the intermediate sections or a part of these sections are wound with another colour combination.

Activation of the pneumatic cylinders for moving and locking thread guide carriage 9, for moving forward reeds 7 and 8 and for moving cam 30 is controlled by a control device 33 which comprises a camshaft driven by drum 1 via a reducing gear and a number of pneumatic valves operated by the cams thereof. The actuation for the positioning device 32 to move nut 12 to the following position can also be obtained from control device 33.

When drum 1 is fully wound it is stopped, all the threads located over separators A are cut through, fixed to warp beam 45 and simultaneously wound on to this, warp beam 45 being driven by rotating roll 46 and drum 1 freely running back. At the end of this re-winding the threads which, owing to the thread crosses, lie in the desired order next to one another, are kept in this order and fixed to warp beam 45, so that they can also be put in this order in the loom.

In a variant of the described embodiment separators B (FIGS. 5 and 6), which separate the first turn from subsequent turns, are designed to be brought from their non-operating stationary position into their operating position by the first turn and need not therefore be operated by cam 30.

Figure 7:
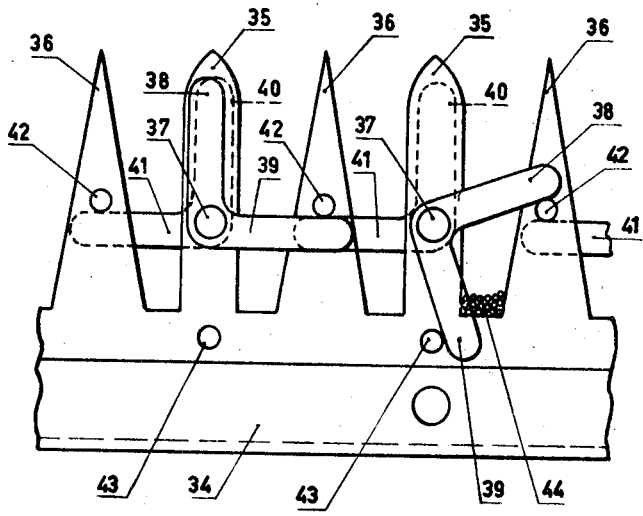

FIG. 7 shows these separators. Carrier 34, which is fixed along one of the ribs of the drum, is equipped with alternating teeth 35 and 36. In each tooth 35 there is a small shaft 37 and on this at the front is separator 38 which has an operating arm 39 perpendicular hereto and at the back separator 40 with a corresponding operating arm 41. By means of torsion springs fitted to the small shafts, not visible in the drawing, operating arms 39 and 41 of separators 38 and of separators 40 are pressed anticlockwise and clockwise respectively against pins 42 fitted in teeth 36, while separators 38 and 40 remain entirely within the periphery of teeth 35.

When a section is wound with a package of threads, the first turn thereof 44, as shown in the drawing, presses arm 39 of separator 38 located over the winding surface of this section downwards until it is stopped by pin 43 fitted in holder 34. Separator 38 is then located over the winding surface, whereby all subsequent turns of the package of threads are laid on this separator 38 and are thereby kept separate from the first winding 44.

We claim:

1. Apparatus for preparing warps for fabrics, more particularly warps for samples and specimens of fabrics, whereby a number of threads are wound on a rotatable drum or similar winding device by means of a thread guide movable axially along the drum in such a manner that the last turn of a certain number of turns is every time separated from the others at a certain place, comprising a drum with a winding surface divided axially into sections, a thread guide with which a large number of threads can be supplied simultaneously to a section of the drum, a moving mechanism for displacing the thread guide stepwise to a following section every time after a specific number of revolutions of the drum, and for each of the sections at least one separator fitted on the periphery of the drum, with which at that place one or more turns can be separated radially from the preceding turn or turns in the same section.

2. Apparatus as claimed in claim 1, wherein each of the separators consists of an arm placed at the edge of a section, at one end rotatably mounted to the drum and pivotable from its stationary position located in a radial plane to an axial position located above the winding surface of the section.

3. Apparatus as claimed in claim 2, wherein each of the separators consists of an arm rotatable around an axis directed radially to the drum.

4. Apparatus as claimed in claim 2, wherein the corresponding separators of the various sections arranged in a row are designed to be moved to their active axial position, against the action of a spring fitted near each of the separators, by the displacement of a common operating device which upon returning to its original position leaves each of the separators free to return to its stationary position under the influence of its spring.

5. Apparatus as claimed in claim 2, wherein the drum is provided with at least two separators for each section and wherein the second separator of each section consists of two arms approximately perpendicular to each other and, from its stationary position in which one arm protrudes approximately radially and the other arm is located approximately axially over the winding surface of the section, is rotatable against the action of a spring but otherwise freely, into a position in which the first arm is located over and the second arm under the winding surface.

References Cited

UNITED STATES PATENTS

| | | | |
|---|---|---|---|
| 450,259 | 4/1891 | Simon | 28—33 |
| 2,127,803 | 8/1938 | Alderman | 28—33 |

FOREIGN PATENTS

| | | |
|---|---|---|
| 647,052 | 6/1937 | Germany. |

LOUIS K. RIMRODT, Primary Examiner